July 25, 1961 L. D. SOUBIER 2,993,302
METHOD AND APPARATUS FOR PRODUCING CHARGES OF MOLTEN GLASS
Filed April 13, 1956 3 Sheets-Sheet 1
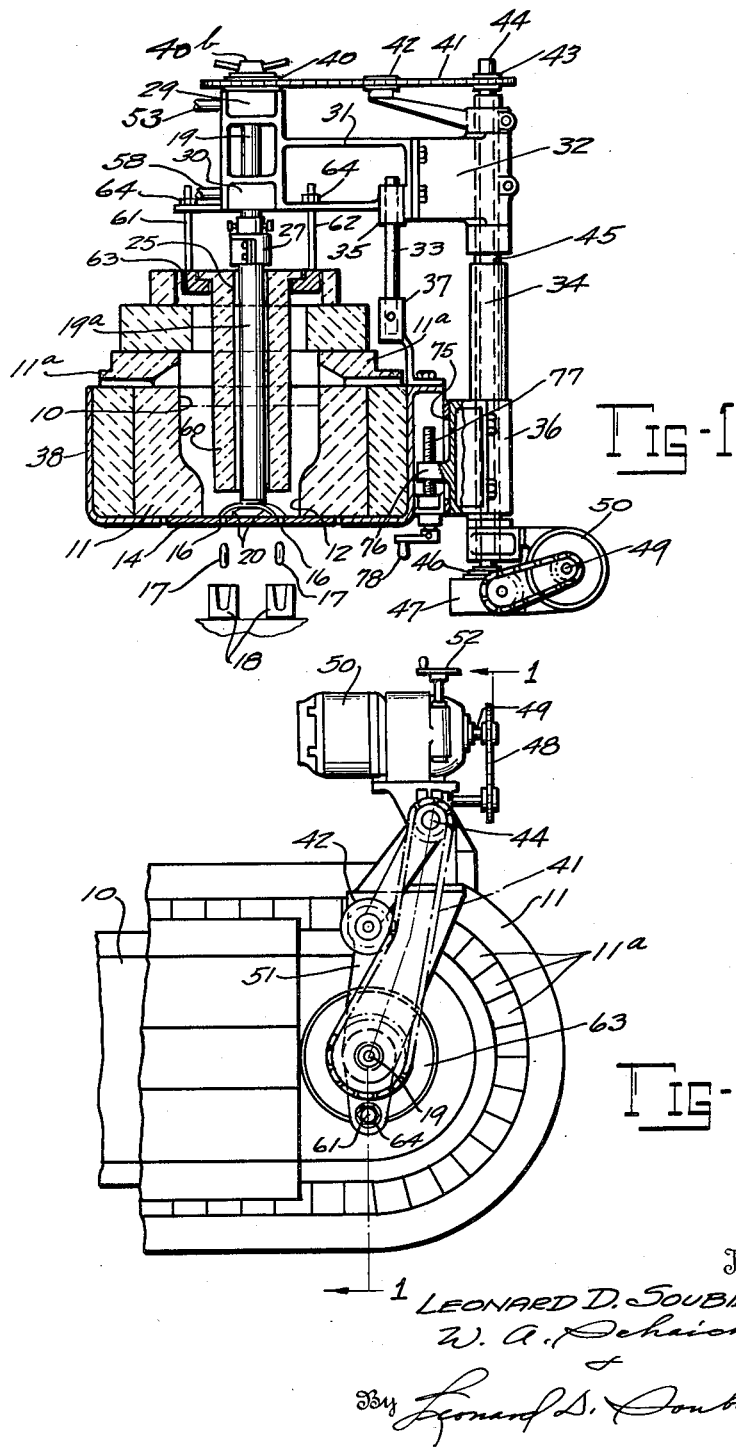
Inventor
LEONARD D. SOUBIER
W. A. Schaich
By Leonard D. Soubier
Attorneys July 25, 1961 L. D. SOUBIER 2,993,302
METHOD AND APPARATUS FOR PRODUCING CHARGES OF MOLTEN GLASS
Filed April 13, 1956 3 Sheets-Sheet 2
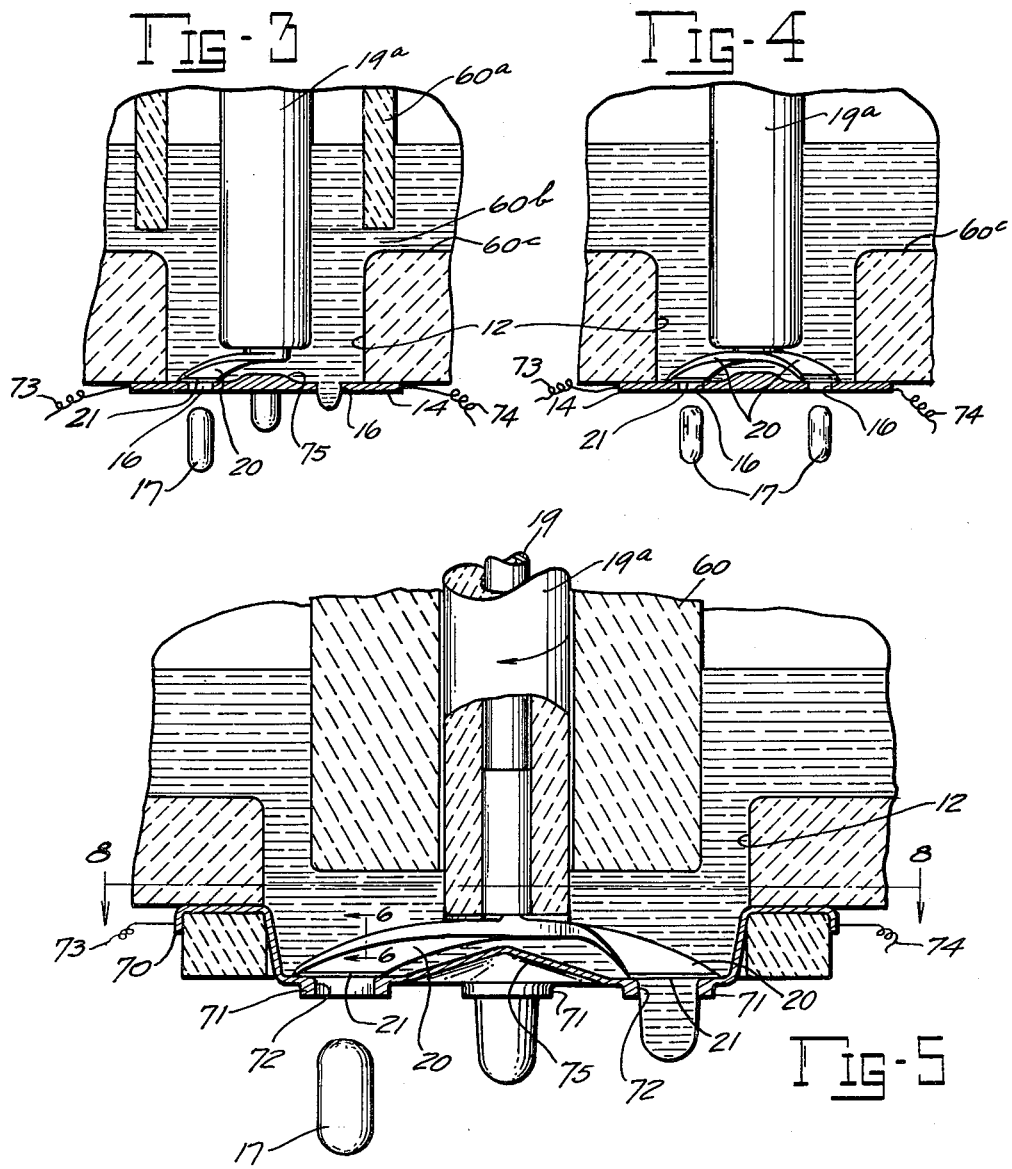
Inventor
LEONARD D. SOUBIER
W. A. Schaich
By Leonard D. Soubier
Attorneys

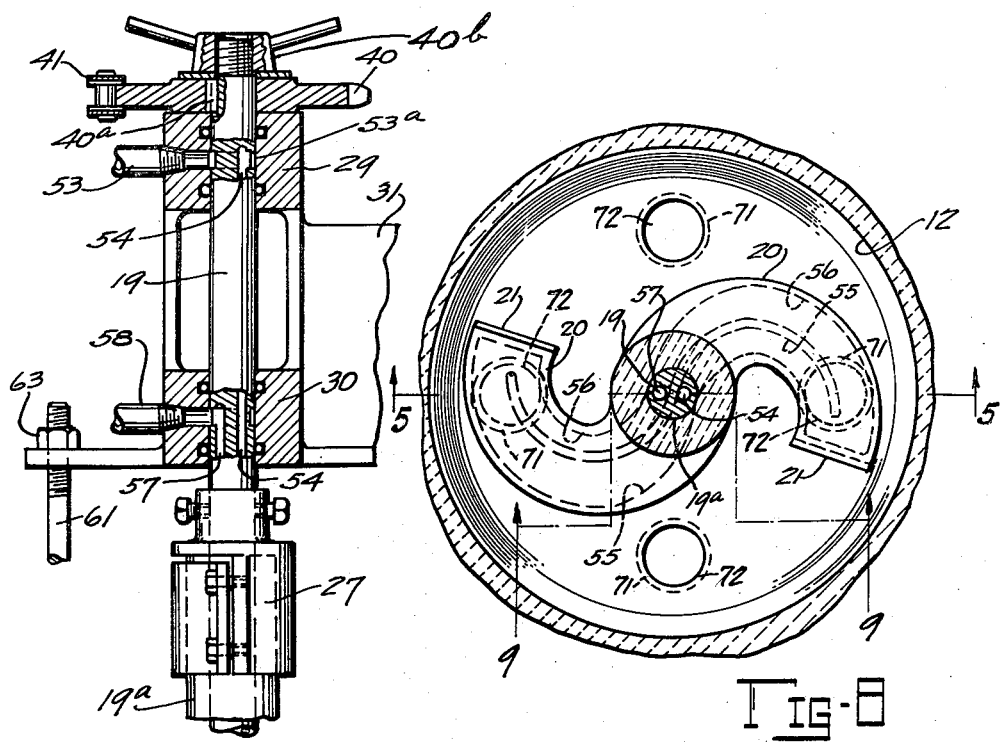
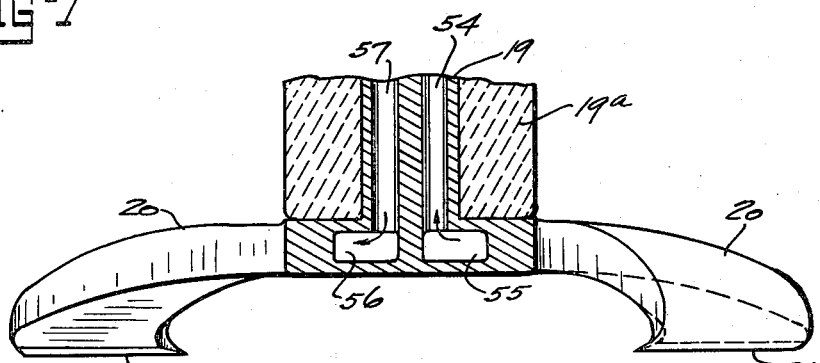

United States Patent Office 2,993,302
Patented July 25, 1961

2,993,302
METHOD AND APPARATUS FOR PRODUCING CHARGES OF MOLTEN GLASS
Leonard D. Soubier, Toledo, Ohio, assignor to Owens-Illinois Glass Company, a corporation of Ohio
Filed Apr. 13, 1956, Ser. No. 578,095
6 Claims. (Cl. 49—55)

This invention relates to a new and novel method of segregating charges or gobs of molten glass from a main supply body thereof.

In particular, this is a method whereby such charges may be separated from the main body at speeds of the order of one hundred per minute upwards and doing this without deflecting the charges out of their alignment with the vertical axis of their point of formation or origination.

In present day gob feeding devices there is a definite lack of means to vary or regulate the rate of continuous flow of glass through an orifice and as a result, the possible speed of productivity for any given set of conditions is limited thereby.

In this present method there is a definite relationship between the glass temperature, pressure head, orifice dimensions, and the rate at which charges will issue through a single or several orificial openings. Inasmuch as the operation of such a method will occur with temperatures of the glass in excess of that now normally used in such devices, it therefore becomes expedient that the pressure head be controlled with considerable accuracy. This may be accomplished by adjustment of the sleeve members which provides control of the depth of glass over the orificial openings.

This method has for its main object, the supplying of a body of molten glass over a single or several orificial openings, controlling the static pressure head over said openings in accordance with the size, and volume of glass to be segregated into charges and then severing the charges from the main supply body at a point between the orificial openings and the supply body.

It is a further object of this present invention to provide a device which will permit the acceleration or deceleration, at will, of the rate of continuous passage of molten glass through orificial openings.

A further object is the equalization of temperature conditions in the glass as fed to and through such orificial openings.

A still further object is the extrusion of the glass through orificial openings under regulable and controlled pressure applied in alignment with the openings.

Other and various objects will be readily apparent from the accompanying description and the drawings in which:

FIG. 1 is a transverse vertical section through a feeding forehearth substantially at the line 1—1 on FIG. 2;

FIG. 2 is a plan view of the nose of the feeder forehearth, showing the means for driving the severing device and supporting pressure applying member;

FIG. 3 is an enlarged, sectional elevational view showing one form of severing member and the orifice member;

FIG. 4 is also an enlarged sectional elevational view, showing a plural severing member and plural orificial openings in the orifice or bushing member;

FIG. 5 is an enlarged sectional elevational view of a modified form showing a severing member and the cooperating pressure control member taken at line 5—5 on FIG. 8;

FIG. 6 is a cross-sectional view taken at 6—6 on FIG. 5 showing the cooling arrangement for the severing member;

FIG. 7 is an enlarged view illustrating the mounting for the severing and pressure control assembly;

FIG. 8 is a sectional plan view taken at line 8—8 on FIG. 5 showing the relationship of the severing means and orifices as well as the cooling structure of the severing means; and FIG. 9 is a sectional view taken at 9—9 on FIG. 8 showing a plural severing means and the cooling arrangement for the severing implement.

Having reference to the accompanying drawings, in FIGS. 1 and 2, a forehearth is shown as having a channel 10 and a glass delivery section 11 at the outer end of the channel 10. The forehearth and delivery section is heated by the usual sidewall burners 11$^a$ positioned along the sides thereof. These sections may be constructed in any of the well-known manners and from the various well-known materials adapted for such purpose. The section 10 is a longitudinally extending channel formation which is in open communication at its inner end with the interior of a glass melting tank (not shown) and also in open communication at its opposite or outer end with the glass delivery section 11 of the forehearth.

As shown, the glass delivery section 11 has a well 12 formed in its bottom portion, said well being located on the longitudinal centerline of the forehearth, if there is only one well to be used. If more than one well is used, they may be spaced apart on the longitudinal centerline, or on opposite sides thereof or both. Said well need not necessarily be in the bottom wall.

Positioned in vertical alignment with well 12, and removably attached therebeneath, is a bushing 14 provided with a series of outlet openings 16 in the bottom thereof.

Mounted above the bushing 14, and extending into the well 12 and in central vertical alignment therewith, is a member 19 having formed on its lower end an arm formation 20. The outer end 21 of arm 20 is adapted when rotated in a clockwise direction, to cooperate with the upper peripheral edge of orifices 16 to sever the glass in a plane above said orifices and to apply increased pressure to the glass over the orificial outlets 16, when said member is rotated in the opposite direction.

The arm 20 is made of a material highly resistant to the action of molten glass and to the high temperature present in the forehearth and has its lower shaft portions protected by cover 19$^a$ which may be a refractory, platinum, etc. As shown in FIG. 1, both the implement 19 and its cover 19$^a$ extend upwardly through the space above the top surface of the glass 22, in the feeding channel 11, through a suitable aperture 25 in the pressure sleeve member 60. The cover 19$^a$ is held in a chuck or clamp 27 by which this implement is operatively connected with the rotating vertical shaft 19. Shaft 19 is supported in its vertical but adjustable position by suitable vertically spaced upper and lower bearing structures 29 and 30, respectively. These are carried by a cross head 31 which has its opposite end portion supported at 32 on a supporting post 34.

This latter post 34 is located at one side of the channel 10 and is supported by bracket 36, which is slidably attached to the side of the outer casting 38 of the forehearth channel structure.

In order to maintain the implement shaft 19 in vertical alignment with the well 12, a guide rod 33 slidable in bearing 35, is permanently mounted in bracket 37, said bracket mounted on the casting 38. Support bracket 36 is mounted in a slideway 75 formed on one side of the casting 38 and has a threaded connection 76 with an adjusting screw 77. An adjusting handle 78 is attached to the lower end of screw 77 to permit vertical adjustment of the severing implement 20 and its drive as a unit.

The shaft 19 carries a sprocket 40 keyed to its upper end portion by the key 40$^a$ and retained by a lock nut 40$^b$. An endless chain 41, FIG. 2, is trained thereabout and also extends around an idler sprocket 42, and a drive sprocket 43 on the upper end of a driven shaft 44 which extends vertically through a suitably provided journal 45 in the supporting upright 34. The shaft 44 is operatively connected at its lower end, as at 46, FIG. 1, with a suitable speed reducing unit 47 which in turn is operatively connected, as by the chain and sprocket mechanism, generally indicated at 48, with the shaft 49 of a variable speed motor 50. The chain 41 is kept desirably taut by a chain tightening idler sprocket 42 which is carried on an arm 51 mounted on the upper end portion of the support 34. The motor 50 is of the adjustable speed type and provided with a speed adjusting member 52 in order that the rotating speed of the severing member 20 may be made suitable to any operating condition.

The severing member or members 20 are provided with circulating cooling provided from inlet 53 which is connected to shaft 19 by a rotary type connection 53ª to conduit 54 extending downwardly through shaft 19. At the lower end of shaft 19 the conduit 54 connects with passage 55 which directs the coolant to the end 21 of the member 20 and thence through passage 56 to the return conduit 57 and the outlet 58. Through regulation of the flow of coolant to and from the end 21 of the severing member 20, the proper temperature conditions of these members may be obtained in this high temperature operation.

It is to be noted that the unit 47 is so arranged that its power input, when transferred to the drive sprocket 40 of the shaft 19, will normally provide rotary motion to shaft 19 in a clockwise direction. However, reversal of the direction of motor rotation will permit use of counterclockwise rotation for any desired purpose. Clockwise rotation of shaft 19 and the interconnected severing implement 20 will provide severing of the glass in a plane above but coincident with and parallel to the upper surface edges of the outlets 16 and a consequent periodic or sequential interruption of the continuous flow of glass through each of said outlets 16, thus forming charges or gobs 17 of molten glass to be fed to the molds 18.

Through the above described mechanism the regulation and control of the rotative speed of the implement 20 may be obtained, in order that the rate of consecutive interruption of the continuous flow of glass through the outlets 16 may be thus regulated and controlled at will and to suit any operating temperature or other condition. Further added control of the quantity of glass per charge 17 may be obtained either by varying either or both the temperature or the depth of the body of the glass over the outlets 16.

The variation of the depth of the glass over the orifices 16, or the static pressure head thereover, may be accomplished by regulation of the vertical position of sleeve 60. This sleeve 60 is suspended from the support frame 31 by rods 61 and 62 attached to the bearing member 63. Adjustment of the nuts 64 on the ends of rods 61 and 62 will raise or lower the vertical position of sleeve 60 in the well 12 and thus control the static pressure head of glass over and in alignment with the orifice openings 16 (FIGS. 1 and 5).

As a modification, a sleeve 60ª (FIG. 3) may be utilized and will be mounted and adjusted in the same manner as member 60. By regulating the area of opening 60ᵇ between the bottom of sleeve 60ª and the floor 60ᶜ of the forehearth channel 10, the rate of flow of glass to well 12 may be controlled and the static pressure head thereby regulated.

In addition, the severing member or members 20 function as a stirring means and thereby maintain the temperature of the body of the glass over bushing 14 and outlets 16 in a completely homogeneous condition, thus insuring an equalized temperature in the flow of glass through each individual outlet.

From the preceding it should be apparent that the rate of continuous feed of molten glass through an orifice or a series of orificial openings may be regulated and controlled at will, and for any desired purpose.

It will be noted that in FIGS. 1 and 4 there is illustrated a double shearing member working in cooperation with the series of outlets 16 in the bushing member 14. In this manner the number of charges to be segregated from the main body of glass is doubled with each revolution of the severing member and of course the ultimate number of gobs to be delivered per minute depends upon the number of revolutions of the severing implement and the number of orificial openings provided in the bushing. Such a severing member can be rotated at speeds of over 100 r.p.m. without any adverse effects upon the glass which means of course that the shearing implement may be rotated at such speed or in excess thereof.

In addition, in order that further temperature control of the glass may be obtained, there has been shown in FIG. 5, a modified type of bushing 70 in which the sidewall portion 71 of the orificial openings 72 have been thickened. This bushing 70 is electrically energized as at 73 and 74 in order to provide a system of temperature control in this area. The thickened walls 71 of the orifice openings 72 will thus provide resistance in the areas surrounding the openings and with increased temperature conditions thereat. Such control is of course dependent upon the supplied energy and the thickness of the orifice walls. The center of the bushing 70 is so shaped at 75 as to prevent any accumulation of stagnant glass.

In general, the operation of the device is as follows: Molten glass flows from the furnace through channel 10 to the delivery section 11 of the forehearth and thence into the well 12. Here the molten glass comes into contact with the implement 20 which will not only completely stir and equalize the temperature thereof, but will also interrupt the flow of glass through the outlets 16 or 72 while simultaneously severing within the well, charges of glass from the body of glass in well 12. The pressure member 60 or sleeve 60ª will be positioned to control the static pressure head of glass active over the various outlets and thereby permit of flow control through the orificial openings 16 or 72.

It is contemplated that in most instances the operating temperature of the glass will be at a temperature level in excess of that normally utilized because this type of gob feeder is designed in particular for high speed operation. Under high speed conditions the glass will be rather liquid in order to obtain rapid flow to and through the orificial openings.

In order to further insure against having variations in temperature as between charges or gobs leaving the several orificial openings 16 or 72, the bushings 14 or 70 may be energized to thereby supply sufficient heat to avoid chilling the glass coming into contact therewith. In addition, the rotation of implement 20 also insures against any local stagnation of glass in the well 12. Thus, with a given temperature condition in the glass and a given size of orifice, the static pressure head over the orifice may be regulated to control the volume of flow of glass through the orifice in any given time interval. Thereby, control of the weight of the gob, regardless of the speed of rotation of the severing implement, may be obtained.

Modifications may be resorted to within the spirit and scope of the appended claims.

I claim:

1. The method of shaping mold charges of molten glass comprising the steps of flowing molten glass to a well having a charge shaping orificial opening in the bottom thereof, controlling the rate of flow of glass to the well thereby maintaining a predetermined head of molten glass over said opening, permitting continuous gravity flow of molten glass through the opening to form cylindrical mold charges of predetermined mass and shape and periodically severing the flow of molten glass in advance of said shaping opening whereby the shaping of the mold charges continues after being severed from the molten glass in the well.

2. The method of shaping mold charges of molten glass comprising the steps of flowing molten glass to a well having a plurality of charge shaping orificial openings in the bottom thereof, controlling the rate of flow of glass to the well thereby maintaining a predetermined head of molten glass over said openings, permitting continuous gravity flow of molten glass through the openings to form mold charges of predetermined mass and shape and periodically severing the molten glass in advance of said shaping openings whereby the shaping of mold charges continues after said severing.

3. In an apparatus for feeding charges of molten glass, the combination of a forehearth, a well in said forehearth, said forehearth and well adapted to contain molten glass, a bushing having an upper, flat surface forming the bottom of said well and having at least one outwardly opening orifice therein, means above and in axial alignment with said well arranged to control the static pressure head over said orifice, and means movable along said surface of the bushing surrounding said orifice and beneath said pressure control means arranged to periodically sever the glass over said orifice.

4. In an apparatus for feeding charges of molten glass, the combination of a forehearth, a well in said forehearth, said forehearth and well adapted to contain molten glass, a bushing having an upper, flat surface forming the bottom of said well and having at least one outwardly opening orifice therein, means to electrically energize and heat said bushing, means above and in axial alignment with said well arranged to control the static pressure head thereover, and means movable along said surface of the bushing surrounding said orifice and beneath said pressure control means arranged to periodically sever the glass over said orifice.

5. In an apparatus for feeding charges of molten glass, the combination of a forehearth, a well in said forehearth said forehearth and well adapted to contain molten glass, a sheet metal bushing of substantially uniform thickness forming the bottom of said well and having integral orificial openings therein, the wall thickness of said openings being greater than that of the bushing, means to electrically energize and heat said bushing, means above and in axial alignment with said well adapted to control the volume of glass flow through said well, a vertically disposed rotatable shaft mounted centrally of said well, a severing device carried at the lower end of said shaft, means to rotate said shaft and severing device within said well and beneath said control means, said severing device adapted to cooperate with the upper peripheral surface edge of each said orifice to sever charges of molten glass therefrom.

6. An apparatus in accordance with claim 5 including means to regulate the speed of rotation of said rotating means.

References Cited in the file of this patent

UNITED STATES PATENTS

| | | |
|---|---|---|
| 814,774 | Dixon et al. | Mar. 13, 1906 |
| 1,660,429 | Soubier | Feb. 28, 1928 |
| 1,828,442 | Rankin | Oct. 20, 1931 |
| 2,100,760 | Wadsworth | Nov. 30, 1937 |
| 2,133,235 | Slayter | Oct. 11, 1938 |
| 2,306,132 | Luertzing et al. | Dec. 22, 1942 |
| 2,310,290 | Honiss | Feb. 9, 1943 |
| 2,422,413 | Hanlon | June 17, 1947 |
| 2,713,698 | Danby et al. | July 26, 1955 |

FOREIGN PATENTS

| | | |
|---|---|---|
| 619,841 | France | Jan. 6, 1927 |
| 831,332 | France | June 7, 1938 |
| 138,895 | Great Britain | Dec. 2, 1920 |